United States Patent [19]

Freeburg

[11] Patent Number: 4,850,032
[45] Date of Patent: Jul. 18, 1989

[54] SIMULCAST DATA COMMUNICATIONS SYSTEM

[75] Inventor: Thomas A. Freeburg, Arlington Heights, Ill.

[73] Assignee: Motorola, Inc., Schaumburg, Ill.

[21] Appl. No.: 122,730

[22] Filed: Nov. 18, 1987

[51] Int. Cl.$^4$ .............................................. H04B 7/00
[52] U.S. Cl. ........................................ 455/51; 455/54; 455/56
[58] Field of Search ...................... 455/51, 18, 33, 53, 455/54, 56, 57; 375/107; 370/108

[56] References Cited

U.S. PATENT DOCUMENTS

| | | | |
|---|---|---|---|
| 4,188,582 | 2/1980 | Cannalte et al. | 325/58 |
| 4,253,181 | 2/1981 | Watten | 370/103 |
| 4,255,814 | 3/1981 | Osborn | 455/51 |
| 4,317,220 | 2/1982 | Martin | 455/53 X |
| 4,411,007 | 10/1983 | Rodman et al. | 375/107 |
| 4,475,246 | 10/1984 | Batlivala et al. | 455/18 |
| 4,481,670 | 11/1984 | Freeburg | 455/33 |
| 4,484,353 | 11/1984 | Flottes et al. | 455/33 |
| 4,506,384 | 3/1985 | Lucas | 455/51 |
| 4,513,416 | 4/1985 | Fujiwara | 370/100 |
| 4,516,269 | 5/1985 | Krinock | 455/51 |
| 4,570,265 | 2/1986 | Thro | 455/52 |
| 4,592,050 | 5/1986 | Bensadon | 370/103 |
| 4,639,937 | 1/1987 | McRae et al. | 455/51 X |
| 4,696,051 | 9/1987 | Breeden | 455/33 |
| 4,696,052 | 9/1987 | Breeden | 455/51 |
| 4,709,402 | 11/1987 | Akerberg | 455/51 |
| 4,718,109 | 1/1988 | Breeden | 455/51 |

Primary Examiner—Robert L. Griffin
Assistant Examiner—Ralph E. Smith
Attorney, Agent, or Firm—Rolland R. Hackbart

[57] ABSTRACT

A data communications system (100) that communicates messages by way of a radio frequency (RF) channel between a network control processor (NCP 102) and subscriber radios (190) located anywhere in a large geographical area that is divided into a plurality of cells or zones, each of which is covered by one or more base station radios (130-132). Base station radios (130-132) and a control station radio (140) are coupled by corresponding general communications controllers (GCCs 120-123) and modems (108-111) via links (150-152) to modems 104-107) coupled to the NCP (102). The control station radio (140) transmits a set-clock message (610) to GCCs (120-122) associated with each of the base station radios (130-132). Each GCC (120-122) is responsive to receipt of the set-clock command for updating its clock (214). Each data message (600) to be transmitted to the subscriber radios (190) may be substantially simultaneously transmitted or "simulcasted" at a pre-selected time. Each data message (600) sent by the NCP (102) to GCCs (120-122) includes an address/-command portion (602), a data portion (603) including XTIME, the pre-selected time of transmission, and an optional information portion (604). Each GCC (120-122) compares the XTIME of a data message to the time indicated on its clock (214) to determine when to transmit the data message. As a result, all base stations (130-132) receiving the same data message (600) from the NCP (102) simulcast that data message at as pre-selected time XTIME.

8 Claims, 4 Drawing Sheets

NETWORK CONTROL PROCESSOR

GENERAL COMMUNICATIONS CONTROLLER

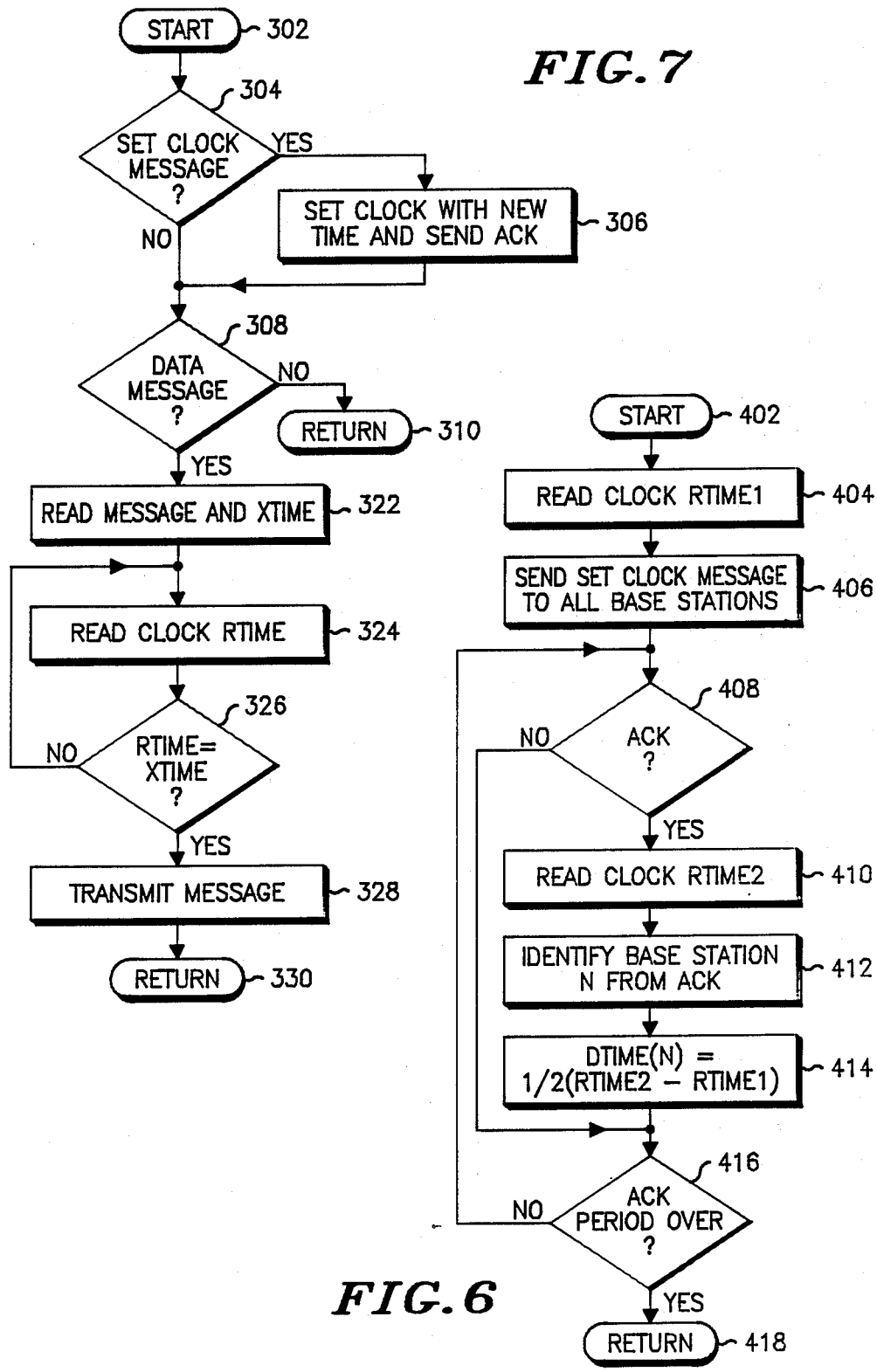

ns systems.

SIMULCAST DATA COMMUNICATIONS SYSTEM

BACKGROUND OF THE INVENTION

The present invention is generally related to simulcast communications systems and more particularly to an improved simulcast data communications systems.

In the prior art, simulcast systems have been used to substantially simultaneously transmit from multiple base stations identical messages at a particular radio frequency. As a result, the same message can be transmitted simultaneously or "simulcasted" over a very large and diverse geographical area. However, in areas covered by two or more base stations, the message may be degraded by differences in the message path delays, phases, modulation levels, and frequencies of the base station transmitters. Such degradation may be reduced somewhat by accurately controlling the base station transmitter frequencies as described in U.S. Pat. No. 4,188,582, by randomly offsetting the base station transmitter frequencies as described in U.S. Pat. No. 4,570,265, and/or by accurately controlling the message delay from the controller to each base station as described in U.S. Pat. No. 4,255,814. However, such prior art techniques typically require expensive microwave links for connecting the controller to each of the base stations and delay compensation circuitry in each of the microwave links. Accordingly, there is a need for an improved method and apparatus for inexpensively compensating for message delays between the controller and the base stations in simulcast communications systems.

OBJECTS OF THE INVENTION

Accordingly, it is an object of the present invention to provide an improved method and apparatus for inexpensively and accurately compensating for message delays between the controller and the base stations in simulcast communications systems.

It is another object of the present invention to provide an improved method and apparatus for simultaneously transmitting the same message at a pre-selected time from selected base stations in a simulcast communications systems.

It is yet another object of the present invention to provide an improved method and apparatus for simultaneously transmitting at a pre-selected time the same message from selected base stations to a subscriber radio, and utilizing the time of reception of acknowledgement messages from the subscriber radio to determine the location of the subscriber radio in a data communications systems.

BRIEF DESCRIPTION OF THE DRAWINGS

FIG. 6 is a flow diagram executed by the network control processor in FIG. 1 for updating the clocks and transmission delay times of each of the general communications controllers.

FIG. 7 is a flow diagram executed by the general communications controller in FIG. 1 for controlling the transmission of messages.

DESCRIPTION OF THE PREFERRED EMBODIMENT

Figure 1:
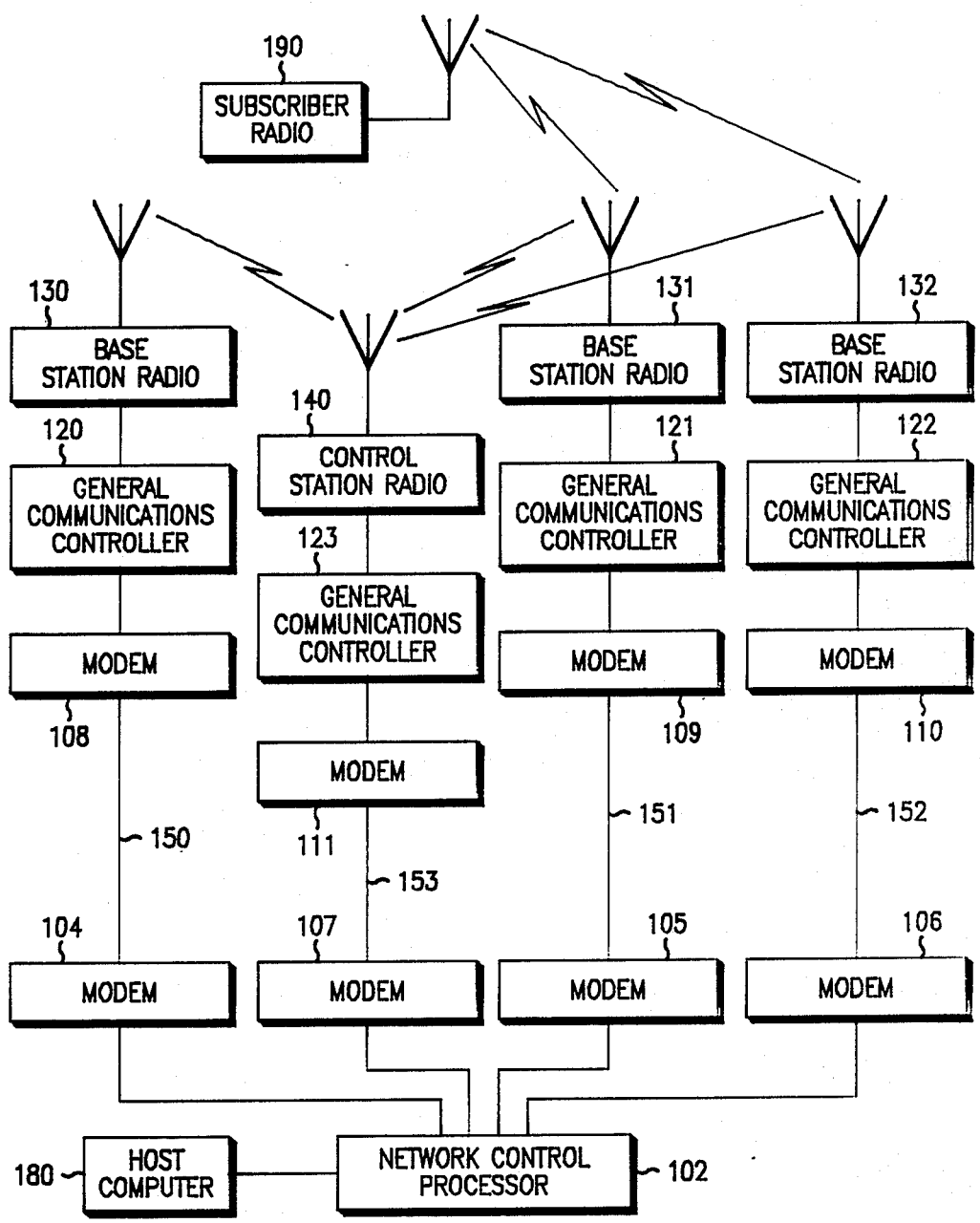
FIG. 1 is a block diagram of a simulcast data communications systems embodying the present invention.

In FIG. 1, there is illustrated a simulcast data communications system 100 that communicates messages between a network control processor (NCP) 102 and subscriber radios 190 by way of a radio frequency (RF) channel. Although described in the context of a data only communications system, both data signals and analog signals such as voice signals can be communicated in messages over the RF channel. System 100 may provide data communications to subscriber radios 190 located anywhere in a large geographical area that is divided into a plurality of cells or zones, each of which is covered by one or more base station radios 130-132. System 100 preferably communicates messages to subscriber radios 190 in the manner described in U.S. Pat. Nos. 4,481,670, 4,517,669 and 4,519,068, all incorporated herein by reference.

Subscriber radios 190 may be hand-held portable radios or vehicular-mounted mobile radios, such as, for example, the radios described in U.S. Pat. Nos. 4,354,252 and 4,636,791 and in Motorola Instruction manual, no. 68P81035C35, available from Motorola C&E Parts, 1313 East Algonquin Rd., Schaumburg, Ill. 60196.

Base station radios 130-132 and control station radio 140 are coupled by corresponding general communications controllers 120-122 and modems 108-111 via links 150-153, such as telephone lines or radio links, to modems 104-107 coupled to NCP 102. Radios 130-132 and 140 each include a transmitter and receiver which may be any suitable commercially available equipment, such as, for example, the transmitter and receiver described in Motorola Instruction manual no. 68P81013E65, available from Motorola C&E Parts, 1313 East Algonquin Rd., Schaumburg, Ill. 60196.

Figure 3:
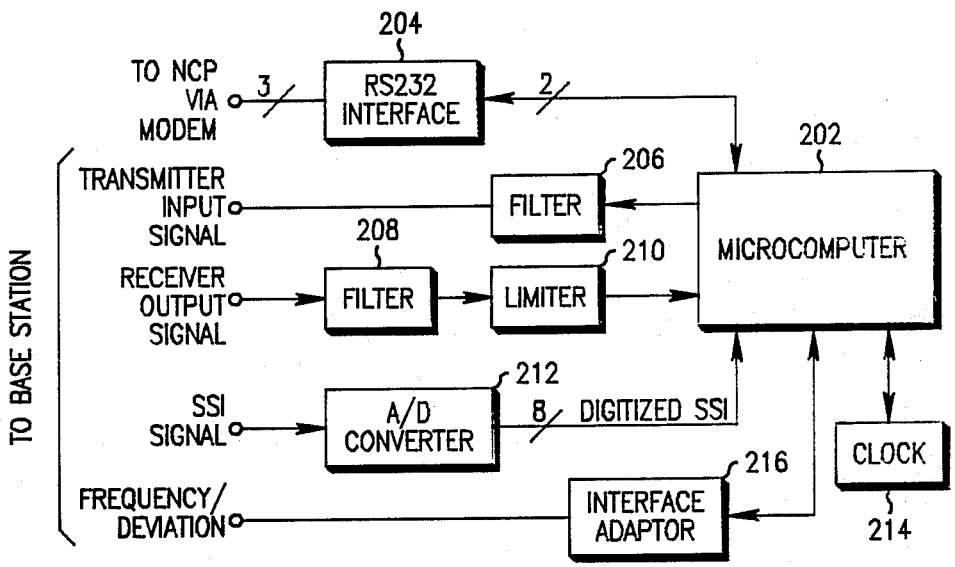
FIG. 3 is a block diagram of the general communications controller in FIG. 1.
Figure 4:
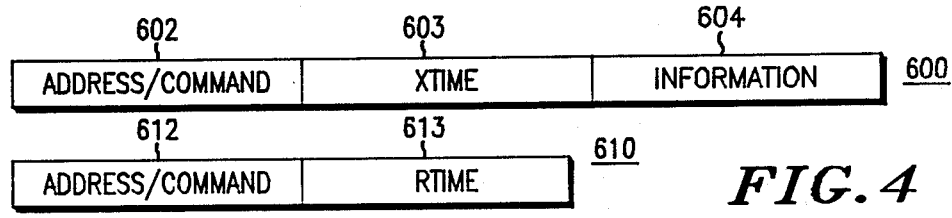
FIG. 4 is a diagram illustrating selected messages utilized in the simulcast data communications in FIG. 1.

According to an aspect of the present invention, system 100 also includes control station radio 140 for transmitting a set-clock message 610 in FIG. 4 to the GCC 120-122 of all base station radios 130-132. Control station radio 140 is identical to base station radios 130-132, with the exception that, in the preferred embodiment, control station radio 140 only transmits set-clock messages. The set-clock message 610 includes an address/command portion 612 including the set-clock command, and a data portion 613 including RTIME, the current time. Each GCC 120-123 is responsive to receipt of the set-clock command for updating its clock 214 in FIG. 3, and thereafter transmitting an acknowledgement message via its link 150-152 to NCP 102. NCP 102 may use the elapsed time between transmission of the set-clock command by control station radio 140 and receipt of each acknowledgement message from base stations 130-132 to estimate the delay time therebetween.

According to a further aspect of the present invention, each data message 600 in FIG. 4 to be transmitted to subscriber radios 190 may be substantially simultaneously transmitted or "simulcasted" at a pre-selected time by base station radios 130-132. As shown in FIG. 4, each data message 600 sent by NCP 102 to GCCs 120-122 includes an address/command portion 602, a data portion 603 including XTIME, the pre-selected time of transmission, and an optional information portion 604. Each GCC 120-122 compares the XTIME of a data message to the time indicated on its clock 214 to determine when to transmit the data message. If data messages 600 need not be simulcasted, NCP 102 sets XTIME equal to zero. If XTIME is zero, each GCC 120-122 transmits the data message immediately after any data messages currently being transmitted.

Figure 2:
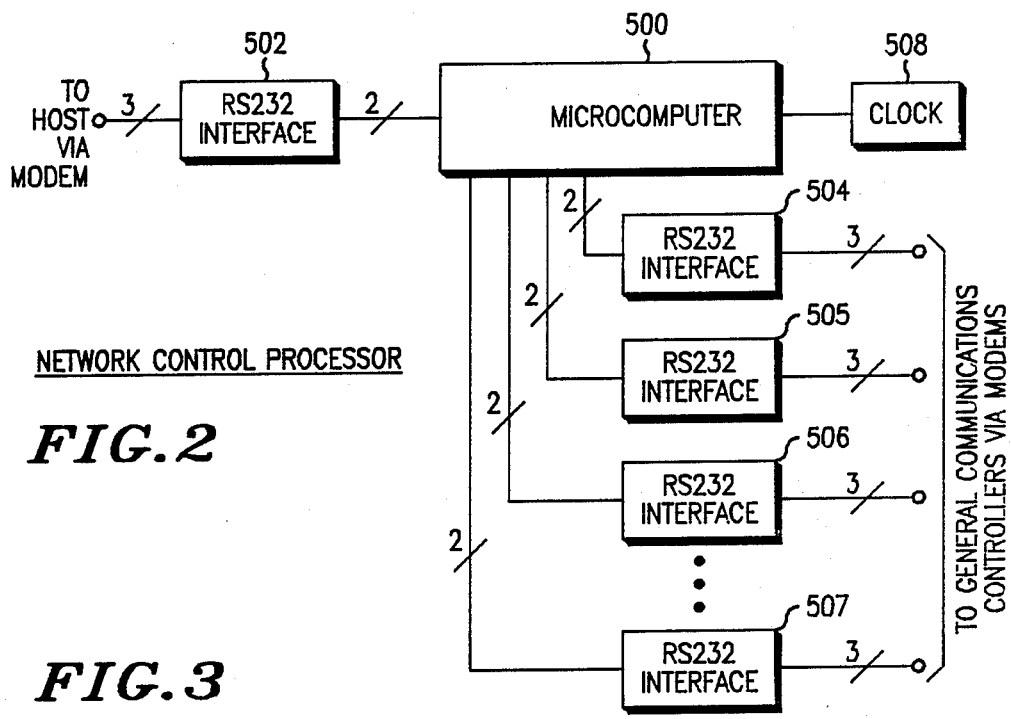
FIG. 2 is a block diagram of the network control processor in FIG. 1.

Referring to FIG. 2, there is illustrated a block diagram of NCP 102 in FIG. 1. NCp 102 includes a microcomputer 500, RS232 interfaces 502 and 504-507, and clock 508. Microcomputer 500 has a memory with a stored program therein for communicating with GCCs 120-123 and subscriber radios 190 (see U.S. Pat. Nos. 4,517,669 and 4,519,068). Microcomputer 500 is coupled to RS232 interfaces 504-507 which are coupled to corresponding modems 104-107 in FIG. 1. Microcomputer 500 is also coupled to RS232 interface 502 which may in turn be coupled by a dedicated telephone line or other link to host computer 180 in FIG. 1. Information in messages received from subscriber radios 190 by way of GCCs 130-132 is forwarded by microcomputer 500 to host computer 180. Conversely, information to be sent to subscriber radios 190 from host computer 180 is transmitted to microcomputer 500 and incorporated into messages for transmission to designated subscriber radios 190. The blocks of NCP 102 in FIG. 2 may be implemented with conventional circuitry, such as, for example, the 6800 or 68000 series of microcomputers and peripheral circuitry available from Motorola, Inc.

Microcomputer 500 in FIG. 2 is also coupled to a clock 508, which may be an atomic-based clock or any other conventional real-time clock circuit. Microcomputer 500 reads clock 508 and adds the read-out time of clock 508 to an offset to produce a time of transmission XTIME. The transmission time XTIME 603 and an optional information portion 604 is appended to data messages 600 in FIG. 4 and simulcasted by selected base station radios 130-132. The clocks 214 of GCCs 120-122 are synchronized to clock 508 by appending the read-out time RTIME of clock 508 to set-clock message 610 in FIG. 4 which is sent by control station radio 140 to the GCCs 120-122 of base station radios 130-132.

Referring to FIG. 3, there is illustrated a block diagram of GCCs 120-123 in FIG. 1. Each GCC 120-123 includes a microcomputer 202, RS232 interface 204, filter 206, filter 208, limiter 210, A/D converter 212, interface adaptor 216, and clock 214. Microcomputer 202 has a memory with a stored program therein for communicating with NCP 102 and subscriber radios 190 (see U.S. Pat. Nos. 4,517,669 and 4,519,068). Microcomputer 202 is coupled to RS232 interface 204 which in turn is coupled by a modem 104-107 to a dedicated telephone line or other link to NCP 102. Messages received by microcomputer 202 from NCP 102 may be coupled to filter 206 and thereafter applied to the transmitter of its corresponding radio 130-132 and 140. Messages received from subscriber radios 190 by the receiver of its corresponding radios 130-132 and 140 are coupled to filter 208 and thereafter to limiter 210, which converts the analog signals into binary signals. The output of limiter 210 is applied to an input port of microcomputer 202. Interface adaptor 216 may be used to measure the phase of messages received from subscriber radios 190. The blocks of GCC 120-123 in FIG. 3 may be implemented with conventional circuitry, such as, for example, the 6800 or 68000 series of microcomputers and peripheral circuitry available from Motorola, Inc.

In addition to receiving and transmitting messages, microcomputer 202 in FIG. 3 also takes signal strength indication (SSI) readings of the messages received from subscriber radios 190 (see U.S. Pat. No. 4,481,670). The SSI signal from the receiver of its corresponding radio 130-132 and 140 is coupled to A/D converter 212, which may continuously convert the analog SSI signal to a digitized SSI signal. The digitized SSI signal from A/D converter 212 is applied to an input port of microcomputer 202. Several A/D conversions may be performed while a message is being received. The digitized SSI signals of the several conversions are averaged by microcomputer 202. The average SSI signal is appended to the received message which is sent by microcomputer 202 via RS232 interface 204 to NCp 102

Microcomputer 202 in FIG. 3 is also coupled to a clock 214, which may be any conventional settable real-time clock circuit. Microcomputer 202 reads clock 214 to determine when to send a data message 600 in FIG. 4 that is to be simulcasted by base station radios 130-132. Clock 214 is synchronized to clock 508 of NCP 102 by presetting clock 214 to the value of RTIME in the set-clock message 610 in FIG. 4 received from NCP 102.

In control station radio 140, microcomputer 202 in FIG. 3 is also coupled to an interface adaptor 216, which may be a conventional peripheral interface adaptor suitable for coupling parallel or serial data to or from microcomputer 202. Interface adaptor 216 may be coupled to the frequency synthesizer of radio 140 for receiving digital data therefrom representative of the frequency of operation or the frequency deviation of the transmitters of radios 130-132. Microcomputer 202 reads interface adaptor 216 to determine the frequency or deviation of the transmitter of a base station radio 130-132 which is transmitting a message. The frequency and deviation measurements taken for base station radios 130-132 are sent by microcomputer 202 of GCC 123 to NCP 102 via link 153. NCP 102 may send messages to a GCC 120-122 for automatically adjusting the frequency or deviation of the transmitter of the associated base station radio 130-132 found to be outside of system specifications.

Figure 5:
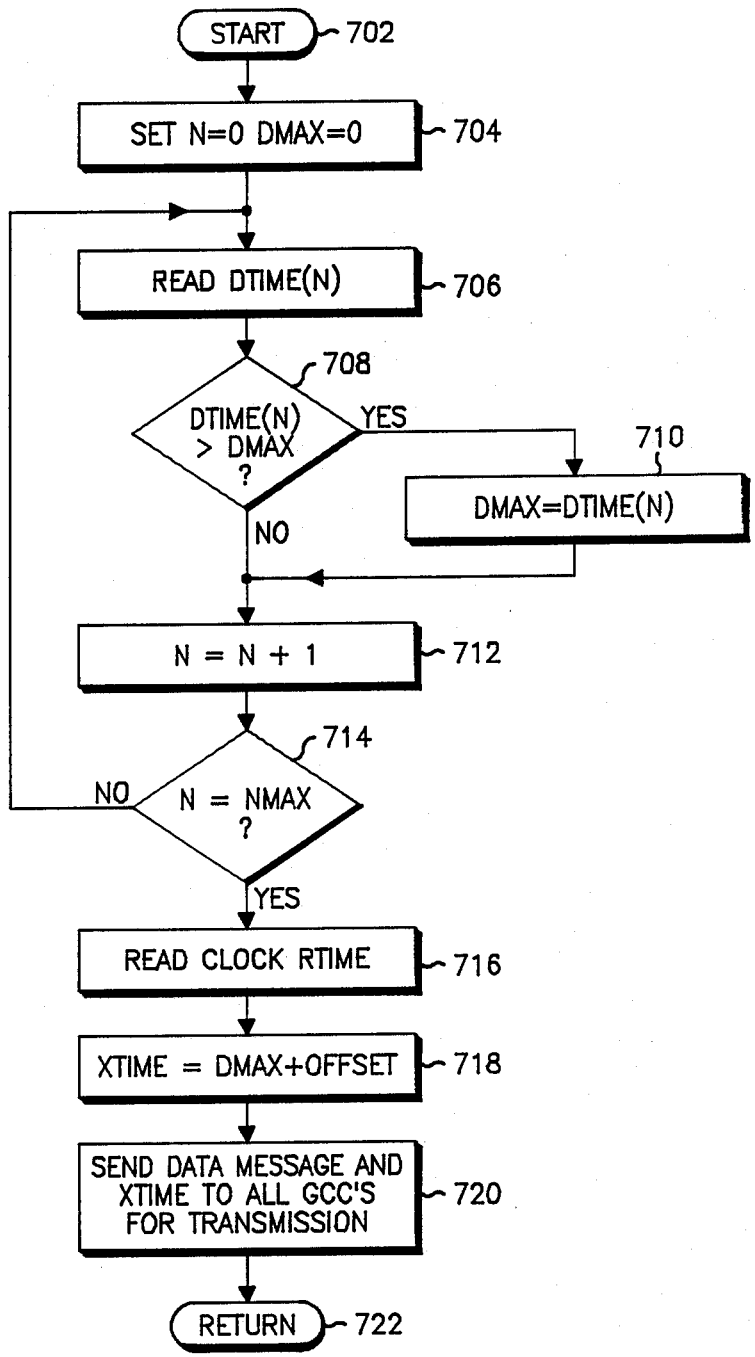
FIG. 5 is a flow diagram executed by the network control processor in FIG. 1 for generating the time of transmission for a message to be transmitted by the base station radios.

Referring to FIG. 5, there is illustrated a flow diagram executed by microcomputer 500 of NCP 102 in FIG. 1 for generating the time of transmission XTIME for a data message 600 to be simulcasted by the base station radios 130-132. Entering at START block 702 and proceeding to block 704, N is set to one and DMAX is set to zero. The number N represents the number of base station radios 130-132 in system 100 and varies from N=1 to N=NMAX.

Next, at block 706, the delay time DTIME(N) for base station radio N is read. The delay time DTIME(N) is an array stored in NCP microcomputer 500 containing the delay time between NCP 102 and base station radio N. As previously explained, the delay time DTIME(N) may be determined by actually measuring the delay of each path using suitable test equipment, or by automatically measuring at NCp 102 the delay between a set-clock message and the acknowledgement thereof from base station radio N, or by any other suitable conventional method of measurement. Next, at decision block 708, a check is made to determine if DTIME(N) is greater than DMAX. If so, YES branch is taken to block 710 where DMAX is set equal to DTIME(N). If DTIME(N) is not greater than DMAX, NO branch is taken from decision block 708 to block 712 where N is incremented by one. Then, at decision block 714, a check is made to determine if N is greater than NMAX. If not, NO branch is taken back to block 706 to read the delay time DTIME(N) for the next base station radio 120-132.

If N is equal to NMAX, YES branch is taken from decision block 714 to block 716 where the real time clock RTIME is read. Then, at block 718, the transmission time XTIME is set equal to DMAX plus a preselected amount of time OFFSET allowing for processing delays. Next, at block 720, the same data message 600 including an address/information portion 602, XTIME 603 and information portion 604 is sent to selected GCCs 120-122 for transmission by the corresponding base station radios 30-132. Depending on the nature of the data message 600 and the size of the system 100, data message 600 may be simulcasted by all or a selected portion of the base station radios 130-132. Thereafter, program control returns to other tasks at RETURN block 722.

Referring to FIG. 7, there is illustrated a flow diagram executed by microcomputer 202 of GCCs 120-122 in FIG. 1 for controlling the transmission of messages. Entering at START block 302 and proceeding to decision block 304, a check is made to determine if a set-clock message 610 has been received. If so, YES branch is taken to block 306 where clock 214 is set with the new time RTIME 613 received in the set-clock message 610, after which, an acknowledgement message is sent over the corresponding link 150-152 to NCP 102. If a set-clock message 610 has not been received, NO branch is taken from decision block 304 to decision block 308 where a check is made to determine if a data message 600 has been received. If not, NO branch is taken to RETURN block 310 to return to other tasks.

If a data message 600 has been received, YES branch is taken from decision block 308 to block 322 where the address/command portion 602, transmission time XTIME 603 and information portion 604 of the data message 600 is read. Then, at block 324, the time RTIME of clock 214 is read. Next, at decision block 326, a check is made to determine if a RTIME is equal to XTIME. If not, NO branch is taken back to block 324 to read clock 214 again. If RTIME is equal to XTIME (exact equality need not be required in practicing the present invention), YES branch is taken from decision block 326 to block 328 where data message 600 is transmitted. All GCCs 120-122 receiving data message 600 will be simulcasting it at substantially the same time. Thereafter, program control returns to other tasks at RETURN block 330.

Additional process steps may be added to FIG. 7 between blocks 328 and 330 for determining the time of reception and phase of an acknowledgement message from the subscriber radio 190 receiving data message 600. Clock 214 is read to provide a time of receipt when the acknowledgement messages is received, and interface adaptor 216 may measure the phase of the acknowledgement message. The time of receipt and phase measurements made by each GCC 120-122 may then be sent to NCP 102. NCP may use the time of receipt and phase measurements to determine the approximate location of the subscriber radio 190 by conventional triangulation calculations.

Referring to FIG. 6, there is illustrated a flow diagram executed by microcomputer 500 of NCP 102 in FIG. 1 for updating the clocks 214 and transmission delay times DTIME of each of the GCCs 120-122. Entering at START block 402 and proceeding to block 404, the time RTIME1 of NCP clock 508 is read. Then, at block 406, a set-clock message 610 is transmitted by control station radio 140 to all base station radios 130-132. Next, at decision block 408, a check is made to determine if an acknowledgement message has been received from any of the GCCs 120-122. If not, NO branch is taken back to decision block 416 to check to determine if the acknowledgement time period is over. If not, NO branch is taken from decision block 416 back to decision block 408.

If an acknowledgement message has been received from one of the GCCs 120-122, YES branch is taken from decision block 408 to block 410 where the time RTIME2 of NCP clock 508 is read again. Then, at block 412, the identity of the base station radio 130-132 is determined from the acknowledgement message. Assuming base station radio N has been identified, the delay time DTIME(N) is set equal to one-half the difference between RTIME2 and RTIME1 at block 414 and stored in the memory of NCP microcomputer 500. Next, at decision block 416, a check is made to determine if the acknowledgement time period is over. If not, NO branch is taken from decision block 416 back to decision block 408. If the acknowledgement time period is over, YES branch is taken from decision block 416 to RETURN block 418 to return to other tasks.

The flow diagrams in FIGS. 5, 6 and 7 provide a detailed description of the process steps used by the microcomputers of NCP 102 and GCCs 120-122 in FIG. 1 for simulcasting messages to subscriber radios 190. The coding of the process steps of the flow diagrams in FIGS. 5, 6 and 7 into the instructions of a suitable commercially available microcomputer is a mere mechanical step for a routine skilled in the art. By way of analogy to an electrical circuit diagram, the flow diagrams in FIGS. 5, 6 and 7 are equivalent to a detailed schematic for an electrical circuit where provision of the exact part values for the electrical components in the electrical schematic corresponds to provision of microcomputer instructions for blocks in the flow diagrams.

In summary, an improved method and apparatus has been described that inexpensively and accurately compensate for message delays between the controller and the base stations in simulcast communications systems. According to another aspect of the present invention, the same message may be simulcasted by selected base station radios at a pre-selected time. The delay compensation and precise simulcasting aspects of the present invention may be advantageously utilized in a variety of applications where simulcast communications are desired. Therefore, while a particular embodiment of the present invention has been shown and described, it should be understood that the present invention is not limited thereto since other embodiments may be made by those skilled in the art without departing from the true spirit and scope thereof. It is thus contemplated that the present invention encompasses any and all such embodiments covered by the following claims.

I claim:

1. A communications system for communicating a data message at a pre-selected time via a radio frequency (RF) channel to a subscriber radio operable on the RF channel and located anywhere in a geographical area, said communications system comprising:
 a plurality of communications links;
 a network controller including clock means and a control station radio operable on the RF channel, said network controller coupled to the clock means for generating periodically a set-clock message and for generating a data message and a pre-selected time of transmission therefor, said network controller coupled to each of the communications links for applying the data message and the pre-selected time of transmission thereto, and said network controller coupled to the control station radio for transmitting the set-clock message on the RF channel;
 a plurality of base station radios each operable on the RF channel for covering a portion of the geographical area; and
 a plurality of base station controllers each including clock means and coupled to a corresponding one of the communications links for receiving the data message and the pre-selected time of transmission, each base station controller coupled to its clock means and a corresponding one of the base station radios for receiving the set-clock message from the RF channel and resetting its clock means in response to the set-clock message, and each of said base station controllers coupled to its clock means and its corresponding one of the base station radios for transmitting the data message on the RF channel at the pre-selected time.

2. The communications system according to claim 1, wherein each of said communications links includes a first modem and a second modem intercoupled by a communications medium, said network controller coupled to each of said first modems, and said base station controllers each coupled to a corresponding one of said second modems.

3. A communications system for communicating a data message having a time of transmission appended thereto via a radio frequency (RF) channel to a subscriber radio operable on the RF channel and located anywhere in a geographical area, said communications system comprising:
 a plurality of base station radios each operable on the RF channel for covering a portion of the geographical area;
 a plurality of base station controllers each including clock means, each base station controller coupled to its clock means and a corresponding one of the base station radios for receiving a set-clock message from the RF channel, each of said base station controllers resetting its clock means in response to the set-clock message, and each of said base station controllers coupled to its clock means and its corresponding one of the base station radios for transmitting the data message on the RF channel at the time of transmission appended thereto;
 a network controller including clock means and a control station radio operable on the RF channel, said network controller coupled to the clock means for generating periodically the set-clock message and generating the data messsage and appending thereto a time of transmission, and said network controller coupled to the control station radio for transmitting the set-clock message on the RF channel; and
 a plurality of communications links each coupling a corresponding base station controller to the network controller.

4. The communications system according to claim 3, wherein each of said communications links includes a first modem and a second modem intercoupled by a communications medium, said network controller coupled to each of said first modems, and said base station controllers each coupled to a corresponding one of said second modems.

5. A simulcast communications system for simultaneously communicating from multiple sites a data message having a time of transmission appended thereto via a radio frequency (RF) channel to a subscriber radio operable on the RF channel and located anywhere in a geographical area, said communications system comprising:
 a plurality of base station radios each located at a different site in the geographical area and operable on the RF channel for covering a portion of the geographical area;
 a plurality of base station controllers each including clock means, each base station controller coupled to its clock means and a corresponding one of the base station radios for receiving a set-clock message from the RF channel, each of said base station controllers resetting its clock means in response to the set-clock message, and each of said base station controllers coupled to its clock means and its corresponding one of the base station radios for transmitting the data message on the RF channel at the time of transmission appended thereto;
 a network controller including clock means and a control station radio operable on the RF channel, said network controller coupled to the clock means for generating periodically the set-clock message and generating the data message and appending thereto a time of transmission, and said network controller coupled to the control station radio for transmitting the set-clock message on the RF channel; and
 a plurality of communications links each coupling a corresponding base station controller to the network controller.

6. The simulcast communications system according to claim 5, wherein each of said communications links includes a first modem and a second modem intercoupled by a communications medium, said network controller coupled to each of said first modems, and said base station controllers each coupled to a corresponding one of said second modems.

7. A communications system for communicating a data message having a time of transmission appended thereto via a radio frequency (RF) channel to a subscriber radio operable on the RF channel and located anywhere in a geographical area, said communications system comprising:
 a plurality of base station radios each operable on the RF channel for covering a portion of the geographical area;
 a plurality of base station controllers each including clock means, each base station controller coupled to its clock means and a corresponding one of the base station radios for receiving a set-clock message from the RF channel, each of said base station controllers resetting its clock means in response to the set-clock message, and each of said base station controllers coupled to its clock means and its corresponding one of the base station radios for transmitting the data message on the RF channel at the time of transmission appended thereto;

a network controller including clock means and a control station radio operable on the RF channel, said network controller coupled to the clock means for generating periodically the set-clock message and generating the data message and appending thereto a time of transmission, and said network controller coupled to the control station radio for transmitting the set-clock message on the RF channel; and a plurality of data links each coupling a corresponding base station controller to the network controller.

8. The communications system according to claim 7, wherein each of said data links includes a first modem and a second modem intercoupled by a communications medium, said network controller coupled to each of said first modems, and said base station controllers each coupled to a corresponding one of said second modems.

* * * * *